(12) United States Patent
Siba et al.

(10) Patent No.: US 7,809,478 B2
(45) Date of Patent: Oct. 5, 2010

(54) SYSTEM AND METHOD FOR MANAGING PORTABLE INFORMATION HANDLING SYSTEM COOLING

(75) Inventors: Erick Arsene Siba, Austin, TX (US); Anil Damani, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 119 days.

(21) Appl. No.: 12/022,495

(22) Filed: Jan. 30, 2008

(65) Prior Publication Data

US 2009/0189496 A1    Jul. 30, 2009

(51) Int. Cl.
*G05D 23/00* (2006.01)
*G05B 15/00* (2006.01)
*H02B 1/00* (2006.01)

(52) U.S. Cl. .................. 700/300; 700/299; 700/275; 361/600

(58) Field of Classification Search .......... 700/300, 700/299, 275; 361/600, 713, 236, 679.54
See application file for complete search history.

(56) References Cited

U.S. PATENT DOCUMENTS

| | | | |
|---|---|---|---|
| 5,249,741 A | 10/1993 | Bistline et al. | |
| 5,552,960 A * | 9/1996 | Nelson et al. | 361/679.54 |
| 5,884,049 A | 3/1999 | Atkinson | |
| 5,935,252 A | 8/1999 | Berglund et al. | |
| 6,101,459 A | 8/2000 | Tavallaei et al. | |
| 6,247,898 B1 | 6/2001 | Henderson et al. | |
| 6,268,664 B1 | 7/2001 | Rolls et al. | |
| 6,313,987 B1 * | 11/2001 | O'Connor et al. | 361/679.46 |
| 6,400,045 B1 | 6/2002 | Hosokawa et al. | |
| 6,453,378 B1 * | 9/2002 | Olson et al. | 710/304 |
| 6,526,333 B1 | 2/2003 | Henderson et al. | |
| 6,601,168 B1 | 7/2003 | Stancil et al. | |
| 6,643,128 B2 | 11/2003 | Chu et al. | |
| 6,687,123 B2 * | 2/2004 | Kitahara | 361/695 |
| 6,873,883 B2 * | 3/2005 | Ziarnik | 700/300 |
| 6,888,332 B2 | 5/2005 | Matsushita | |
| 6,894,896 B2 * | 5/2005 | Lin | 361/695 |
| 7,065,347 B1 * | 6/2006 | Vikse et al. | 455/419 |
| 7,155,921 B2 * | 1/2007 | Lee et al. | 62/176.1 |
| 7,161,799 B2 * | 1/2007 | Lim et al. | 361/679.55 |
| 7,286,907 B2 * | 10/2007 | Schanin et al. | 700/300 |
| 7,472,215 B1 * | 12/2008 | Mok et al. | 710/304 |
| 2001/0033475 A1 * | 10/2001 | Lillios et al. | 361/687 |

(Continued)

FOREIGN PATENT DOCUMENTS

GB    2405034 A    2/2005

(Continued)

*Primary Examiner*—Albert DeCady
*Assistant Examiner*—Jason Lin
(74) *Attorney, Agent, or Firm*—Hamilton & Terrile, LLP; Robert W. Holland

(57) ABSTRACT

Information handling system thermal parameters applied by a thermal manager to manage cooling are adjusted based on whether or not a thermal barrier is coupled to the information handling system. The presence of a thermal barrier allows higher operating temperatures without exposing an end user to excessive thermal energy. The thermal barrier couples to the bottom of the chassis of a portable information handling system and may provide additional features, such as additional battery power storage or an optical drive.

19 Claims, 4 Drawing Sheets

U.S. PATENT DOCUMENTS

| | | | |
|---|---|---|---|
| 2003/0005201 A1* | 1/2003 | Olson et al. | 710/303 |
| 2003/0058615 A1* | 3/2003 | Becker et al. | 361/687 |
| 2003/0128509 A1* | 7/2003 | Oudet | 361/687 |
| 2003/0161101 A1 | 8/2003 | Hillyard et al. | |
| 2003/0225542 A1 | 12/2003 | Liu et al. | |
| 2004/0080909 A1* | 4/2004 | Kitahara | 361/687 |
| 2004/0111559 A1 | 6/2004 | Heil | |
| 2005/0128700 A1* | 6/2005 | Alperin et al. | 361/687 |
| 2005/0161197 A1* | 7/2005 | Rapaich | 165/80.4 |
| 2005/0273845 A1* | 12/2005 | Urano et al. | 726/9 |
| 2007/0091560 A1* | 4/2007 | Parker | 361/687 |
| 2007/0109725 A1* | 5/2007 | Lindell et al. | 361/600 |
| 2007/0217150 A1* | 9/2007 | Long et al. | 361/696 |
| 2008/0005409 A1* | 1/2008 | Kolokowsky et al. | 710/62 |
| 2008/0151492 A1* | 6/2008 | Maddox | 361/687 |
| 2008/0291621 A1* | 11/2008 | Regimbal et al. | 361/686 |

FOREIGN PATENT DOCUMENTS

| | | |
|---|---|---|
| JP | 11085323 A | 3/1999 |
| WO | WO 2005/017478 | 2/2005 |

* cited by examiner

SYSTEM AND METHOD FOR MANAGING PORTABLE INFORMATION HANDLING SYSTEM COOLING

BACKGROUND OF THE INVENTION

1. Field of the Invention

The present invention relates in general to the field of information handling system cooling, and more particularly to a system and method for adjusting portable information handling system cooling.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

When information handling systems were first developed, manufacturers typically built large box-shaped housings to hold the many components used to build an information handling system. Over time, manufacturers strove to reduce the size of information handling system housings so that their reduced footprint had less of an impact in an office or home environment. Eventually, portable information handling systems entered the market with housings sized so that an end user could carry the system while in use. Portable information handling systems initially tended to have reduced capabilities compared with desktop or tower information handling systems since the portable housing had to include a power source and integrated display. Manufacturers of portable information handling systems tended to use smaller and less capable components, which tended to have smaller footprints and reduced power consumption. However, increasing capabilities and decreasing size of components used to build information handling systems has led to greater capabilities in portable information handling systems. The improved capabilities of portable information handling systems has led to greater acceptance and usage of portable information handling systems so that end users have recently tended towards selecting portable systems as replacements for desktop and tower information handling systems.

Manufacturers typically face two substantial challenges when incorporating more advanced components into portable housings so that portable information handling system performance approaches that of desktop and tower systems: power consumption and cooling. More powerful processing components tend to consume more power when performing increased numbers of calculations and thus reduce the time that portable information handling system can operate on internal power, such as a battery. More powerful processing components also tend to produce additional heat as a byproduct when performing increased numbers of calculations. Cooling components within a portable housing presents a challenge since the reduced size of the housing makes an effective cooling airflow difficult to achieve. Further, creating a substantial airflow through a portable housing uses additional power and tends to gather dust at the cooling vents through which the airflow travels, making the cooling airflow less efficient. One approach used to manage power consumption and heat is to throttle the operation of processing components, such as CPU operating speeds, so that less power is consumed and less heat created. However, throttling processing components reduces the operating capability of the information handling system. In some systems, heat generated by processing components, even in a throttled state, can make a portable information handling system uncomfortable for an end user to hold in his lap. End users sometimes place a heat barrier beneath the portable information handling system to protect their lap from this heat, such as a thermal slice that attaches to the bottom of the information handling system or other types of pads, bases or shields.

SUMMARY OF THE INVENTION

Therefore a need has arisen for a system and method which manages information handling system performance based on whether a barrier protects an end user from heat produced by the information handling system.

In accordance with the present invention, a system and method are provided which substantially reduce the disadvantages and problems associated with previous methods and systems for managing information handling system performance. Coupling and uncoupling of a thermal barrier to an information handling system is detected to select thermal parameters for managing cooling within the information handling system.

More specifically, a thermal manager operating in firmware of an information handling system, such as the BIOS, sets thermal parameters for managing cooling within the chassis of the information handling system based on detection of coupling or uncoupling of a thermal barrier to the bottom of the chassis by a thermal barrier attachment detector. If a thermal barrier is coupled to the base of the information handling system chassis, the thermal manager selects thermal parameters that allow a higher temperature within the chassis than is allowed without a thermal barrier. The higher internal temperature allows the cooling fan to rotate at a slower speed and the CPU to operate at a greater clock speed since the thermal barrier will protect against passage of excess thermal energy from the bottom of the information handling system chassis to an end user. Operating the cooling fan at slower rotation speeds reduces dust and other contaminants from building up within the cooling subsystem of the information handling system so that the cooling subsystem operates more efficiently for a greater lifetime. Cooling system lifetime efficiency is further extended by including a filter in the thermal barrier.

The present invention provides a number of important technical advantages. One example of an important technical advantage is that information handling system performance is selectively increased if a barrier is detected that protects an end user from heat created by the information handling system. By increasing allowed operating temperatures, processing component performance may increase for a better end user experience and cooling subsystem operations may decrease for reduced acoustic noise and power consumption, such as by running a cooling fan at a lower temperature. Reduced cooling fan operating speeds reduce build of dust in vents for improved long term operations of the information handling system. The ability to detect a heat barrier and adjust cooling subsystem operations accordingly allows information handling systems to be built smaller, thinner and lighter, giving end users the option of attaching a heat barrier if greater system performance is desired.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
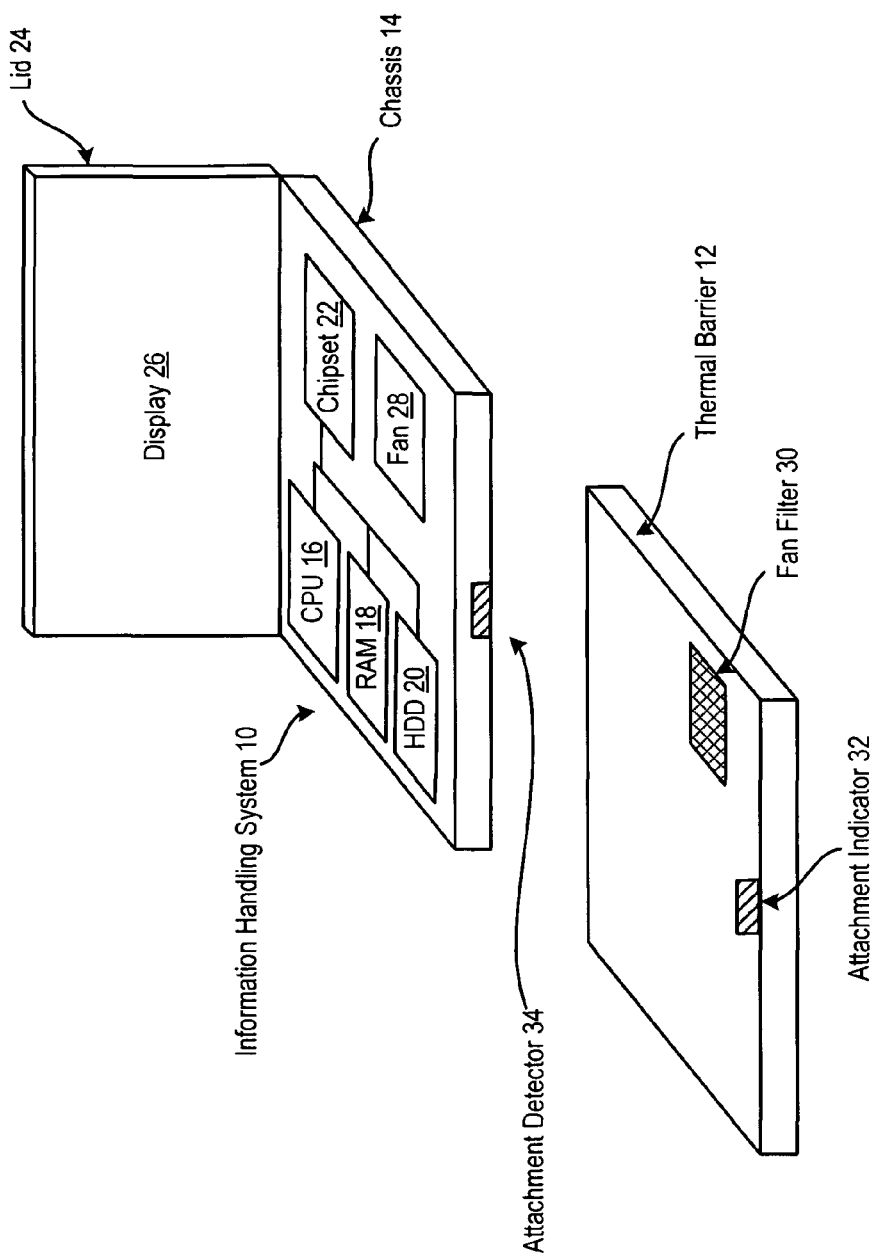
FIG. 1 depicts a portable information handling system in an open position and having a thermal barrier aligned to couple to the bottom surface of its chassis.

Referring now to FIG. 1, a portable information handling system 10 is depicted in an open position and having a thermal barrier 12 aligned to couple to the bottom surface of its chassis 14. Chassis 14 has a bottom portion that supports plural processing components, such as CPU 16, RAM 18, hard disk drive 20 and chipset 22, and a lid 24 that supports a display 26, such as an integrated liquid crystal display (LCD). Heat generated by the processing components within chassis 14 is removed by a cooling fan 28, which generates a cooling airflow through vents formed in the side and bottom surfaces of chassis 14. The speed at which cooling fan 28 operates is set by firmware in chipset 22 to prevent excessive internal temperatures within chassis 14 while running cooling fan 28 at a minimal speed to reduce power consumption and acoustic noise. In the example of the portable information handling system 10 depicted by FIG. 1, the temperature maintained within chassis 14 is also kept to a maximum value so that the bottom surface temperature will not become uncomfortable for an end user who places portable information handling system 10 in her lap. In the event that cooling fan 28 cannot keep the bottom surface temperature sufficiently low, throttling of CPU 16 to operate at slower clock speeds is commanded by the firmware to reduce the heat produced by CPU 16 and thus the amount of thermal energy that cooling fan 28 must remove from within chassis 14.

Although CPU throttling will help maintain a comfortable temperature at the bottom surface of chassis 14, CPU throttling also reduces the performance of information handling system 10. In order to improve information handling system performance by reducing the need for CPU throttling to maintain a comfortable temperature at the bottom of chassis 14, thermal barrier 12 couples to the bottom surface of chassis 14 to reduce the amount of thermal energy passed from chassis 14 to an end user. Thermal barrier 12 is, for instance, a hollow or insulated piece sized to align and couple with the bottom surface of chassis 14. Alternatively, thermal barrier 12 provides additional functions to information handling system 12, such as an external attachable battery slice or media slice having an optical drive. In the embodiment depicted by FIG. 1, a fan filter 30 is integrated in thermal barrier 12 so that cooling airflow pulled by fan 28 into chassis 14 is filtered before entering chassis 14. Fan filter 30 is removable for cleaning so that captured dust does not slow cooling airflow. By capturing contaminants that would otherwise enter chassis 14, fan filter 30 prevents clogging of cooling elements within chassis 14, which can decrease the efficiency of cooling elements forcing greater CPU throttling and fan speeds. An attachment indicator 32 aligns with an attachment detector 34 so that firmware in chipset 22 detects whether or not thermal barrier 12 is coupled to chassis 14. Thermal parameters are selected for managing cooling within chassis 14 based on whether or not thermal barrier 12 is coupled to the bottom of chassis 14. For example, internal operating temperatures are increased if thermal barrier 12 is coupled to chassis 12, thus reducing the need for CPU throttling and increasing performance of information handling system 10.

Figure 2:
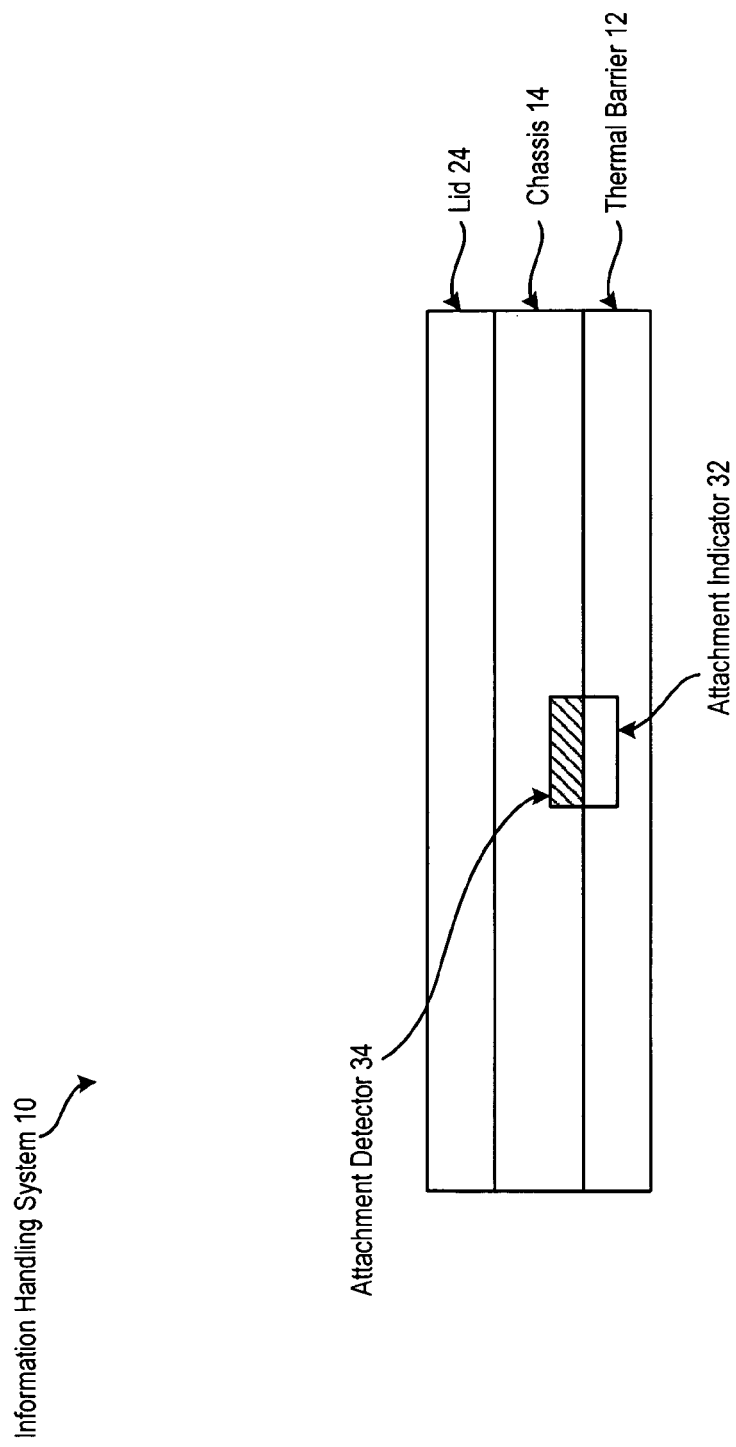
FIG. 2 depicts a side view of a portable information handling system in a closed position with a thermal barrier coupled to the bottom surface of its chassis.

Referring now to FIG. 2, a side view depicts a portable information handling system 10 in a closed position with a thermal barrier 12 coupled to the bottom surface of its chassis 14. Attachment indicator 32 inserts into attachment detector 34 to communicate the presence of thermal barrier coupled to chassis 14. For example, attachment indicator 32 may insert a pin into a switch of attachment detector 34 to indicate the coupling of thermal barrier 12. Alternatively, attachment indicator 32 may communicate identification information to attachment detector 34 to identify the type of thermal barrier 12 that is coupled to chassis 14. For example, identification information provided by thermal barrier 12 indicates the degree of insulation provided by thermal barrier 12 so that thermal parameters for operating with different types of thermal barriers are applied by information handling system 10 to prevent excessive heat at the bottom surface of thermal barrier 12. Thermal barrier 12 increases the height of information handling system 10 in the closed position, making information handling system 10 less portable when attached. Thus, an end user has the option to attach thermal barrier 12 when greater information handling system performance is desired and to remove thermal barrier 12 when greater portability is desired.

Figure 3:
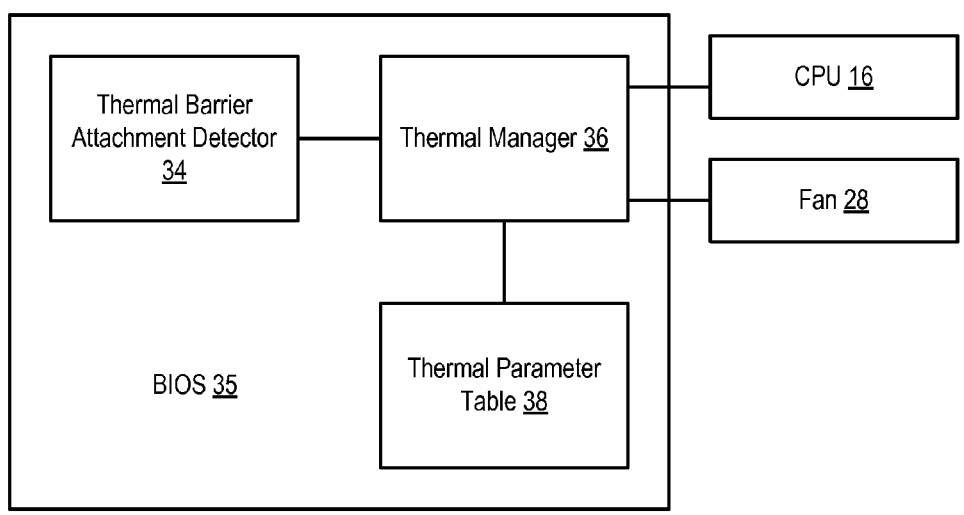
FIG. 3 depicts a block diagram of a system for managing information handling system cooling based on whether a thermal barrier is coupled to the information handling system.

Referring now to FIG. 3, a block diagram depicts a system for managing information handling system cooling based on whether a thermal barrier is coupled to the information handling system. Firmware instructions in a Basic Input/Output System (BIOS) 35 include thermal barrier attachment detector 34, which detects attachment of a thermal barrier to an information handling system and signals the attachment to a thermal manager 36. Thermal manager 36 selects thermal parameters for use in operation of the information handling system from a thermal parameter table 38 and commands operation of CPU 16 and fan 28 according to the selected thermal parameters. If a thermal barrier is detected by thermal barrier attachment detector 34, then thermal manager 36 selects thermal parameters from thermal parameter table 38 to allow an increased operating temperature so that CPU 16 operates at relatively higher clock speeds and fan 28 operates at relatively lower rotation speeds. If no thermal barrier is detected, thermal manager 36 selects thermal parameters from thermal parameter table 38 for normal operating conditions so that CPU 16 operates at a relatively lower clock speed and fan 28 operates at a relatively higher rotation speed. In one embodiment, an identifier provided by thermal barrier attachment detector 34 to thermal manager 36 allows selection of thermal parameters based upon the relative insulation provided by the thermal barrier. For example, a battery or optical drive thermal slice might provide less insulation than a thermal slice designed specifically for blocking transfer of thermal energy.

Figure 4:
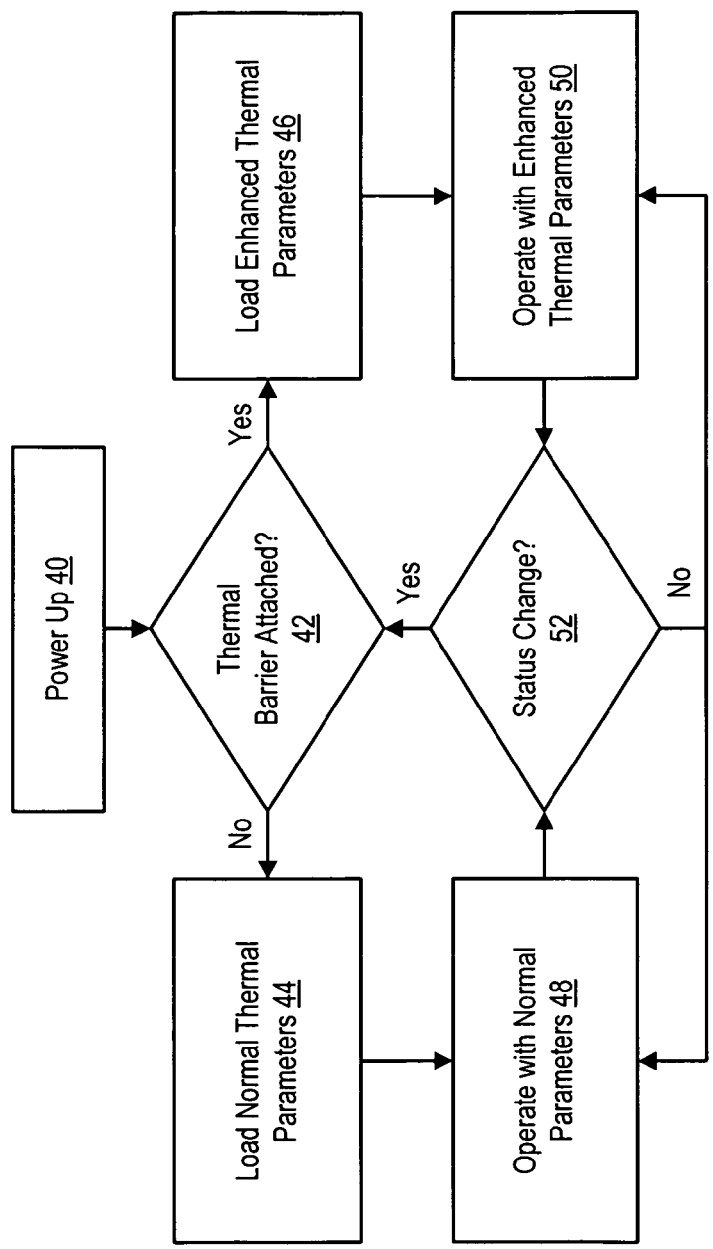
FIG. 4 depicts a flow diagram of a process for managing information handling system cooling based on whether a thermal barrier is coupled to the information handling system.

Referring now to FIG. 4, a flow diagram depicts a process for managing information handling system cooling based on whether a thermal barrier is coupled to the information handling system. The process begins at step 40 with power up of the information handling system. At step 42, a determination is made of whether a thermal barrier is attached to the information handling system. If no, the process continues to step 44 to load normal thermal parameters for managing cooling of the information handling system. If yes, the process continues to step 46 to load enhanced thermal parameters for managing cooling of the information handling system with elevated internal operating temperatures. At step 48, the information handling system operates at normal parameters and, at step 50, the information handling system operates with enhanced thermal parameters. Periodically, the process continues to step 52 to determine if a status change has occurred, such as the coupling or uncoupling of the thermal barrier to the information handling system. If the thermal barrier status remains unchanged the process continues to step 48 or 50 based on the status of the thermal barrier coupling. If a status change has occurred in the coupling or uncoupling of the thermal barrier, the process returns to step 42 to determine if the thermal barrier is attached. For example, the information handling system is rebooted to reset the thermal parameters in the firmware.

Although the present invention has been described in detail, it should be understood that various changes, substitutions and alterations can be made hereto without departing from the spirit and scope of the invention as defined by the appended claims.

What is claimed is:

1. An information handling system comprising:
    a chassis;
    plural processing components disposed in the chassis and operable to process information;
    a fan disposed in the chassis and operable to cool the processing components according to thermal parameters;
    a thermal barrier detector operable to detect coupling of a thermal barrier to the chassis; and
    a thermal manager interfaced with the thermal barrier detector and the fan, the thermal manager operable to apply first thermal parameters at the fan if the thermal barrier is coupled to the chassis and second thermal parameters at the fan if the thermal barrier is not coupled to the chassis;
    wherein the first thermal parameters comprise an operating temperature having a first fan speed for the processing components disposed in the chassis and the second thermal parameters comprise a second fan speed for the processing components within the chassis at the operating temperature, the second fan speed greater than the first fan speed.

2. The information handling system of claim 1 further comprising a thermal barrier operable couple to the chassis to impede thermal energy transfer from the chassis.

3. The information handling system of claim 2 wherein the thermal barrier comprises a filter disposed proximate the fan.

4. The information handling system of claim 2 wherein the thermal barrier detector is further operable to initiate a boot of the processing components upon detecting the coupling or uncoupling of a thermal barrier.

5. The information handling system of claim 2 wherein the thermal barrier comprises a battery.

6. The information handling system of claim 2 wherein the thermal barrier comprises an optical drive.

7. The information handling system of claim 1 wherein the thermal barrier detector is further operable to read an identifier from the thermal barrier and to select thermal parameters associated with the identifier.

8. The information handling system of claim 1 wherein the thermal parameters comprise a maximum operating temperature within the chassis, the first thermal parameter maximum operating temperature greater than the second thermal parameter maximum operating temperature.

9. A method for managing information handling system cooling, the method comprising:
    detecting whether a thermal barrier is coupled to the bottom surface of the information handling system, the thermal barrier impeding transfer of thermal energy from the bottom surface;
    setting first thermal parameters if a thermal barrier is coupled to the bottom surface of the information handling system, the first thermal parameters providing a first operating temperature; and
    setting second thermal parameters if a thermal barrier is not coupled to the bottom of the information handling system, the second thermal parameters setting a second operating temperature;
    wherein the first operating temperature is greater than the second operating temperature.

10. The method of claim 9 further comprising:
    detecting a change in status for the coupling of the thermal barrier; and
    presenting a request to reboot the information handling system.

11. The method of claim 9 further comprising:
    inserting a filter in the thermal barrier; and
    guiding cooling airflow through the filter to the information handling system.

12. The method of claim 9 further comprising:
    communicating an identifier from the thermal barrier to the information handling system; and
    setting the first thermal parameters according to the identifier.

13. The method of claim 9 wherein the thermal barrier comprises a battery.

14. The method of claim 9 wherein the thermal barrier comprises an optical drive.

15. A system for managing information handling system cooling, the system comprising:
- a thermal barrier detector operable to detect coupling of a thermal barrier to the information handling system;
- a thermal parameter table having plural thermal parameters for managing the cooling of the information handling system; and
- a thermal manager interfaced with the thermal barrier detector and the thermal parameter table, the thermal manager operable to select thermal parameters based on the detecting of a thermal barrier, the thermal parameters providing a greater internal operating temperature within the information handling system if a thermal barrier is detected than if a thermal barrier is not detected.

16. The system of claim 15 further comprising a thermal barrier operable to insulate thermal energy between the information handling system and an end user by coupling to the information handling system.

17. The system of claim 16 further comprising a filter disposed in the thermal barrier operable to filter cooling airflow into the information handling system.

18. The system of claim 16 wherein the thermal barrier comprises a battery.

19. The system of claim 16 wherein the thermal barrier comprises an optical drive.

* * * * *